US012108849B1

(12) United States Patent
Nguyen

(10) Patent No.: US 12,108,849 B1
(45) Date of Patent: Oct. 8, 2024

(54) SYSTEMS AND METHODS FOR SAFE OBJECT RETRIEVAL

(71) Applicant: Nathan Nguyen, Garden Grove, CA (US)

(72) Inventor: Nathan Nguyen, Garden Grove, CA (US)

( * ) Notice: Subject to any disclaimer, the term of this patent is extended or adjusted under 35 U.S.C. 154(b) by 0 days.

(21) Appl. No.: 18/433,930

(22) Filed: Feb. 6, 2024

Related U.S. Application Data

(60) Provisional application No. 63/601,138, filed on Nov. 20, 2023.

(51) Int. Cl.
| | | |
|---|---|---|
| A45B 3/00 | (2006.01) | |
| A45B 9/02 | (2006.01) | |
| B25J 1/04 | (2006.01) | |
| B25J 15/06 | (2006.01) | |
| A45B 9/00 | (2006.01) | |

(52) U.S. Cl.
CPC ............... A45B 3/00 (2013.01); A45B 9/02 (2013.01); B25J 1/04 (2013.01); B25J 15/0608 (2013.01); *A45B 2009/002* (2013.01); *A45B 2009/007* (2013.01)

(58) Field of Classification Search
CPC .. A45B 9/04; A45B 3/00; A45F 5/004; A61H 3/0288
See application file for complete search history.

(56) References Cited

U.S. PATENT DOCUMENTS

| | | | | |
|---|---|---|---|---|
| 3,731,698 A * | 5/1973 | Buchalter | ................ | A45B 9/04 135/84 |
| 6,105,190 A * | 8/2000 | Shiao | ...................... | B25B 23/12 7/165 |
| 6,220,262 B1 * | 4/2001 | Hasebe | .................... | A45B 1/04 135/65 |
| 6,392,517 B1 * | 5/2002 | Coleman, Jr. | ......... | H01F 7/0257 81/24 |
| 6,502,727 B1 * | 1/2003 | Decoteau | ................ | H04M 1/04 242/379.2 |
| 6,666,115 B2 * | 12/2003 | Liu | ........................ | B25B 11/002 7/138 |
| 7,374,216 B2 * | 5/2008 | Rousey | ................... | A47F 13/06 294/24 |
| 7,418,972 B2 * | 9/2008 | Reeves | .................... | A45B 3/00 294/24 |
| 7,686,025 B1 * | 3/2010 | Dowling | .............. | A61H 3/0288 135/84 |

(Continued)

*Primary Examiner* — Noah Chandler Hawk
(74) *Attorney, Agent, or Firm* — JT IP Law, PC

(57) ABSTRACT

A system for reducing falls includes a base having a polyhedron shape with: a first face configured to rest on a flat surface, a second face spaced apart from and parallel to the first face, and having a base diameter, and at least three sides extending between the first face and the second face. The system further includes a handle configured for gripping, and a shaft coupled to and extending between the handle and the second face of the base, having a shaft diameter, and extending outward from the base in a direction perpendicular to a plane defined by the second face. The base diameter is at least twice as large as the shaft diameter such that pressure applied to the second face of the base by a foot causes the handle to raise from a ground surface, and the base, handle, and shaft together function as a cane.

14 Claims, 9 Drawing Sheets

(56) References Cited

U.S. PATENT DOCUMENTS

| | | | | |
|---|---|---|---|---|
| 2007/0277863 A1* | 12/2007 | Gordon | ................... | A45B 3/04 |
| | | | | 135/910 |
| 2011/0259381 A1* | 10/2011 | Adams | ................... | A45B 9/04 |
| | | | | 135/82 |
| 2013/0032185 A1* | 2/2013 | Sato | ................... | A45B 9/04 |
| | | | | 135/77 |
| 2013/0199587 A1* | 8/2013 | Reydel | ................... | A45B 9/04 |
| | | | | 135/77 |
| 2021/0186189 A1* | 6/2021 | Salentine | ........... | A45C 13/1069 |

\* cited by examiner

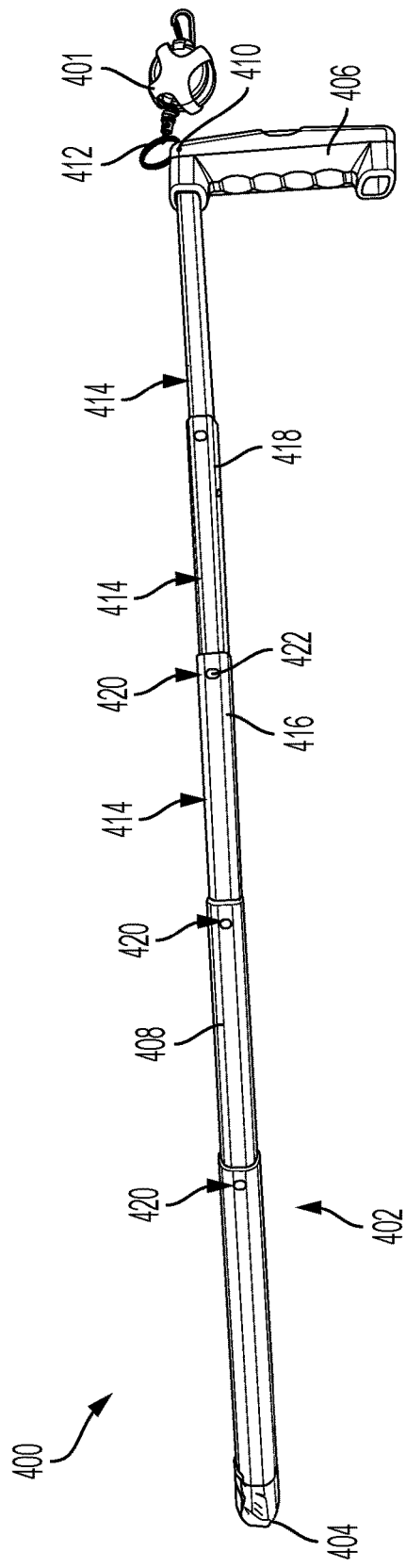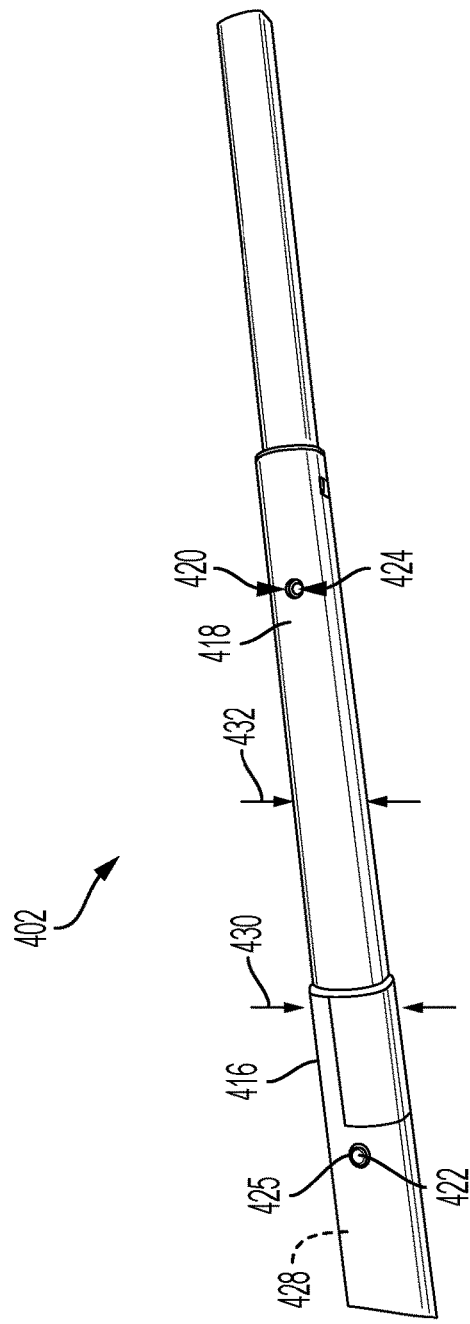
FIG. 4A
FIG. 4B

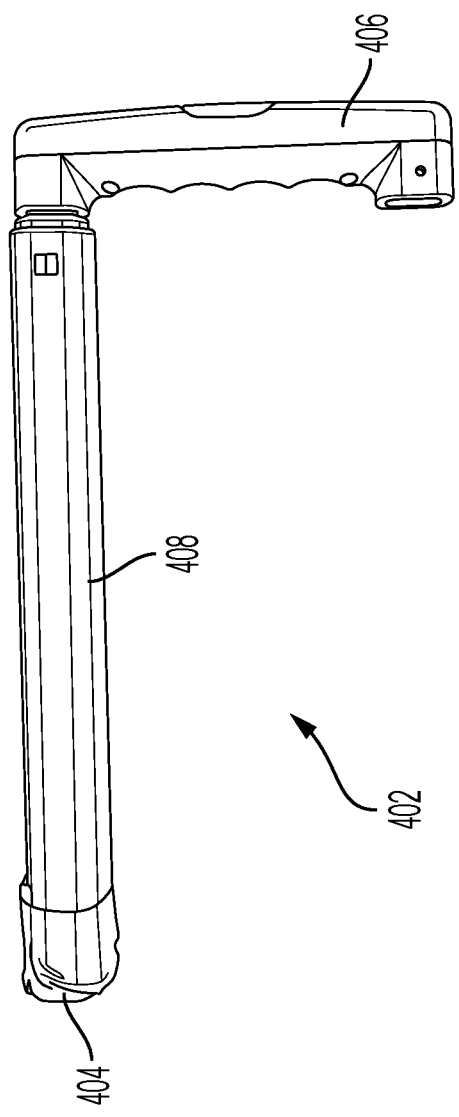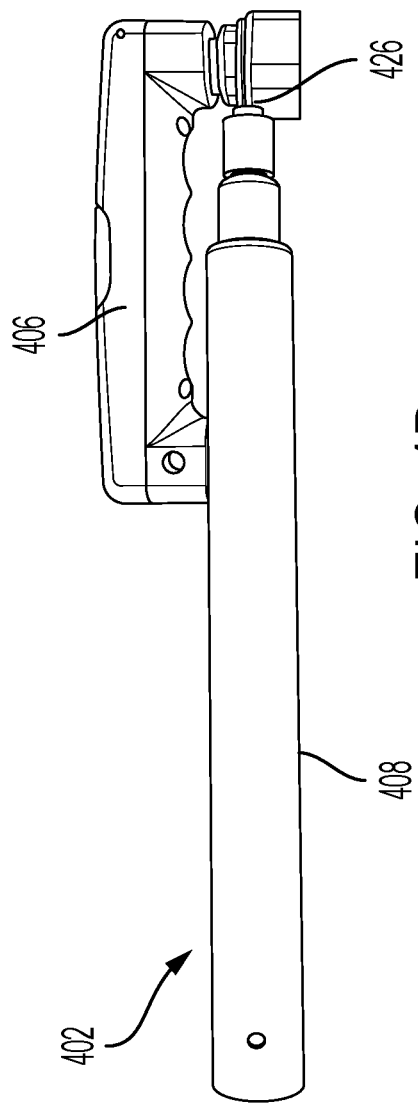
FIG. 4C
FIG. 4D

SYSTEMS AND METHODS FOR SAFE OBJECT RETRIEVAL

CROSS REFERENCE TO RELATED APPLICATIONS

This application is a continuation of U.S. Provisional Patent Application No. 63/601,138, titled SYSTEMS AND METHODS FOR SAFE OBJECT RETRIEVAL and filed on Nov. 20, 2023, the entire contents of which being hereby incorporated by reference in its entirety.

BACKGROUND

Field

The present disclosure is directed to systems and methods for safe retrieval of objects by individuals and, more particularly, to systems and methods that allow old, incapacitated, or infirm individuals to retrieve objects with minimal risk of undesirable falls.

Description of the Related Art

As an upright human, falling is always undesirable and uncomfortable. However, as people age, the effects of a fall increase from young people who may experience minor bumps and bruises from a fall to elderly individuals who may experience broken bones, traumatic brain injury (TBI), and even death from a fall. Unfortunately, falls increase in likelihood as a person ages due to eroding senses (e.g., resulting from cataracts or neuropathy), a loss of balance, chronic pain, dementia, or the like.

Many situations may increase the likelihood of an elderly person falling. These situations include an uneven walking surface (e.g., bumps on a sidewalk), climbing up or down a set of stairs without a handrail for the person to stabilize themselves, a slippery walking surface (e.g., wet leaves or ice), and bending over to retrieve objects from a relatively low location. Although individuals have little control over some of these conditions, a person may take action to reduce the likelihood of falls from others. For example, a person can select a walking route that avoids stairs and uneven walking surfaces, and may stay home after snowstorms. However, there is not much that someone can do to safely retrieve an object from a relatively low position.

Thus, there is a need in the art for systems and methods for safe retrieval of objects.

SUMMARY

Described herein is a system for reducing the likelihood of falls. The system includes a base having a polyhedron shape with: a first face configured to rest on a flat surface, a second face spaced apart from and parallel to the first face, and having a base diameter, and at least three sides extending between the first face and the second face. The system further includes a handle configured for gripping. The system further includes a shaft coupled to and extending between the handle and the second face of the base, having a shaft diameter, and extending outward from the base in a direction perpendicular to a plane defined by the second face. The base diameter is at least twice as large as the shaft diameter such that pressure applied to the second face of the base by a foot causes the handle to raise from a ground surface, and the base, handle, and shaft together function as a cane.

Also described is a system for reducing the likelihood of falls. The system includes a metallic feature configured to be coupled to a target object for retrieval. The system further includes a magnetic retriever having: a retriever handle for gripping the magnetic retriever, a magnet configured to attract the metallic feature, and a telescoping arm extending between and coupled to the retriever handle and the magnet, and configured to extend to increase a distance between the retriever handle and the magnet to facilitate retrieval of the target object via the attraction between the magnet and the metallic feature, and to collapse to reduce the distance between the retriever handle and the magnet.

Also described is a system for reducing the likelihood of falls. The system includes a metallic feature configured to be coupled to a target object for retrieval. The system further includes a magnetic retriever having: a retriever base with a retractable reel coupled thereto, a magnet configured to attract the metallic feature, and a flexible line extending between and coupled to the retractable reel and the magnet, and configured to be pulled from the retractable reel to extend the flexible line from the retriever base and to be retracted back onto the retractable reel to wind the flexible line around the retractable reel.

BRIEF DESCRIPTION OF THE DRAWINGS

Other systems, methods, features, and advantages of the present disclosure will be or will become apparent to one of ordinary skill in the art upon examination of the following figures and detailed description. It is intended that all such additional systems, methods, features, and advantages be included within this description, be within the scope of the present disclosure, and be protected by the accompanying claims. Component parts shown in the drawings are not necessarily to scale, and may be exaggerated to better illustrate the important features of the present disclosure. In the drawings, like reference numerals designate like parts throughout the different views, wherein:

FIG. 4A is a side view of a system for reducing the likelihood of falls including a magnetic retriever and a walking device with a telescoping shaft, in accordance with various embodiments of the present disclosure;

FIG. 4B is a perspective view of the walking device of FIG. 4A illustrating features of the telescoping shaft, in accordance with various embodiments of the present disclosure;

FIG. 4C is a side view of the walking device of FIG. 4A with the telescoping shaft in a fully compact state, in accordance with various embodiments of the present disclosure;

FIG. 4D is a side view of the walking device of FIG. 45A with a handle rotated to a fully compact state, in accordance with various embodiments of the present disclosure;

DETAILED DESCRIPTION

The present disclosure describes systems and methods for reducing falls by elderly or infirm individuals, or individuals who have lost some level of mobility. Many of these people use a cane or walker to assist with mobility. However, when an individual with mobility issues drops a cane, difficulty may arise in retrieving the cane from the fallen position. The present disclosure solves this issue by designing a cane that can be retrieved without increased risk of falling. One way in which this benefit is achieved is by including a base on the cane that has a greater diameter than a diameter of a shaft of the cane; this relatively large base allows a user to exert a relatively small force to the base using their foot to cause the cane to become upright and therefore graspable without the user having to bend over. Another solution provided herein is the use of multiple magnetic retrievers. The magnetic retriever may be portable and adjustable to vary a distance between the user's grip and a magnet. The magnet may attract a fallen object with metal thereon, thus allowing the user to retrieve the object using the magnetic retriever while again reducing the likelihood of falling. The systems and methods herein may further provide metallic features to be attached to objects for retrieval using the magnetic retriever, thus allowing more objects to be retrieved with the reduced risk of falling.

Benefits and advantages of the present disclosure are readily apparent. These benefits and advantages include the reduced risk of a fall from an elderly or infirm individual, or any other individuals with mobility issues. By reducing the risk of falling, the likelihood of a host of other ailments is similarly reduced, such as the likelihood of painful bumps, bruises, scrapes, etc., the likelihood of broken bones or sprained joints, the likelihood of traumatic brain injury (TBI), or the like. The systems and methods herein further provide the advantage of facilitating retrieval of objects from difficult-to-reach locations such as retrieval of keys from underneath a restaurant table, a phone from beneath a drainage gate, or the like.

Figures 1A, 1B:
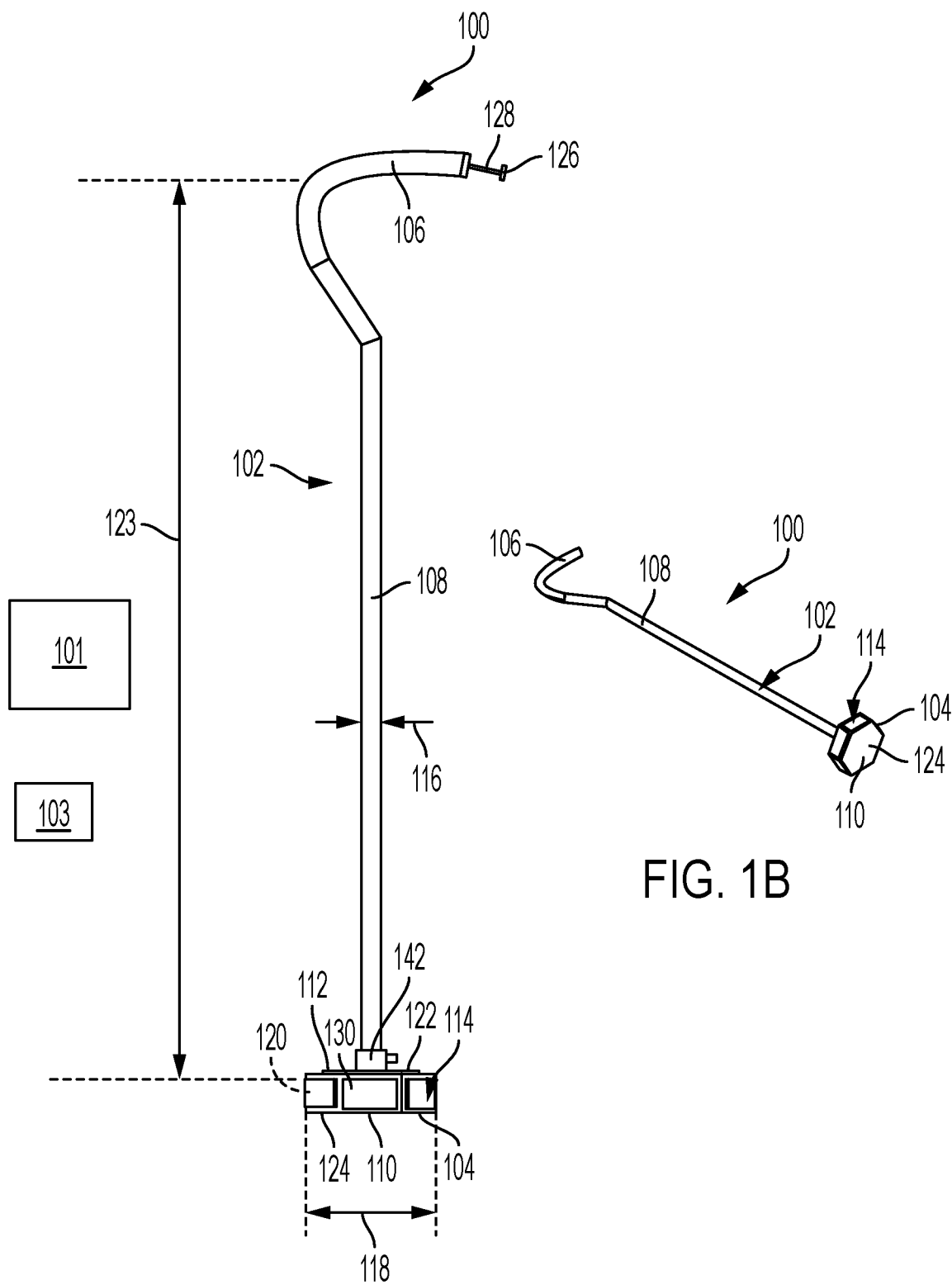
FIG. 1A is a side view of a system for reducing the likelihood of falls that includes a walking device, in accordance with various embodiments of the present disclosure.
FIG. 1B is a perspective view of the walking device of FIG. 1A, in accordance with various embodiments of the present disclosure.
Figure 1C:
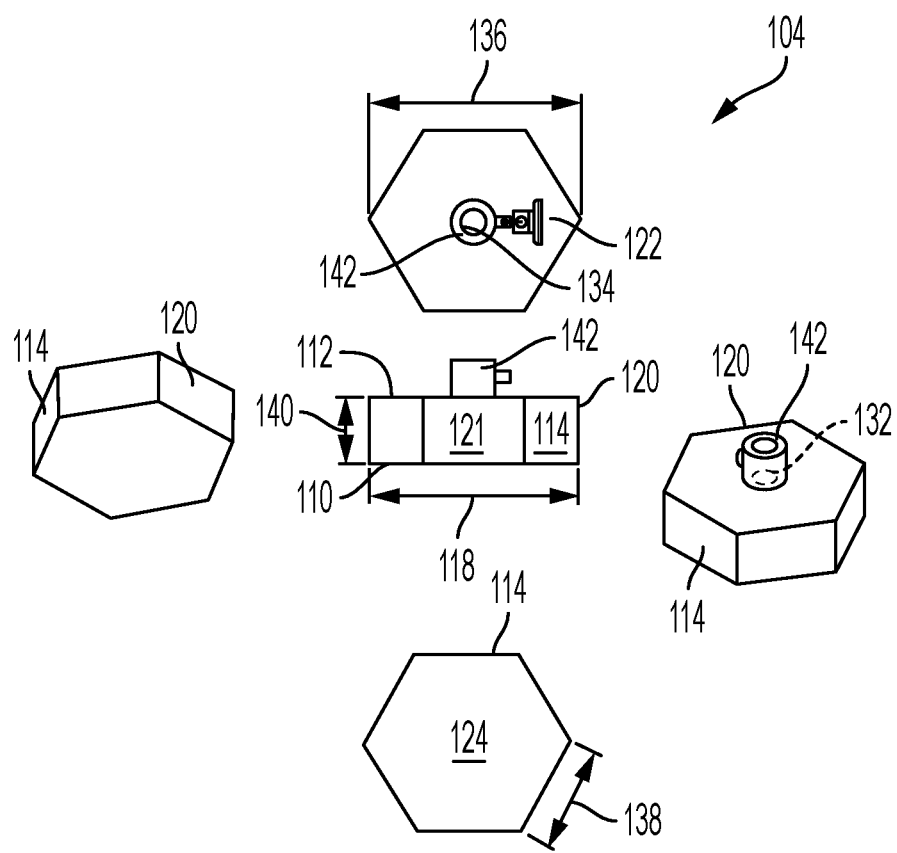
FIG. 1C shows multiple views of a base of the walking device of FIG. 1A, in accordance with various embodiments of the present disclosure.

Referring now to FIGS. 1A, 1B, and 1C, a system 100 for reducing the likelihood of falls is shown. The system 100 includes a magnetic retriever 101, a walking device 102, and some metallic features 103, 126, 130. Any quantity of metallic features 103 may be used with the system 100 so long as the metal used in the metallic feature is attracted to magnets. The metallic features 103 may be a permanent part of an object (e.g., a key or keychain) or may be attached to an object by a user (e.g. a metallic sheet with adhesive for attaching to a target object), a metal object tied or clipped to a target object, or the like).

The walking device 102 may function as a cane and may include a base 104 designed to contact a ground surface, a handle 106 for grasping by a user, and a shaft 108 coupled to and extending from the handle 106 to the base 104. Each of the base 104, handle 106, and shaft 108 may be formed using any materials such as metals, plastics, rubbers, other polymers, or the like. Each of the base 104, handle 106, and shaft 108 may be permanently coupled together, formed integral or monolithic, removably coupled together, or any combination thereof. For example, the handle 106 may be formed integral or monolithic with the shaft 108, may be coupled to the shaft 108 using adhesive, a snap-fit connector, screw threading, or any additional or alternative fastening means. Similarly, the shaft 108 may be formed integral or monolithic with the base 104, coupled to the base 104 using adhesive, a snap-fit connector, screw threading, or any additional or alternative fastening means.

In some embodiments, the base 104 may include a raised sheath 142 extending therefrom in a same direction as the shaft 108. The shaft 108 may be received by the raised sheath 142 while the shaft 108 is coupled to the base 104. The raised sheath 142 may be permanently coupled to the base 104, may be removably coupled to the base 104, or may be formed integral or monolithic with the base 104. The raised sheath 142 may provide increased stability of the walking device 102 by reducing the likelihood of the shaft 108 moving relative to the base 104. Furthermore, the base 104, handle 106, and shaft 108 may be formed using the same material, different materials, or any combination thereof (e.g., rubber and plastic for the base 104 and metal for the shaft 108).

In some embodiments, the handle 106 may have an ergonomic design to reduce stress and strain on a user's body. In some embodiments, the handle 106 may include a cushion or other material positioned thereon to increase comfort when gripping and using the walking device 102. As shown in FIG. 1A, the handle 106 may be formed integral or monolithic with the shaft 108, or the handle 106 may be formed separate from the shaft 108 and later permanently or removably coupled thereto. The shaft 108 (and the handle 106) may be formed using a solid rod or other form of material (e.g., may be cast with metal or formed with plastic or another polymer), may be designed to be hollow to reduce a total mass of the walking device 102, or may be partially solid and partially hollow.

A distance, or height, 123 may exist from the handle 106 to the base 104. The distance 123 may be sufficiently large to allow the walking device 102 to function as a cane. For example, the distance 123 may be between 1 foot and 5 feet, between 2 feet and 4 feet, or the like. In some embodiments, the distance 123 may be adjustable, for example, by adjusting features of the shaft 108. For example, fasteners may be used to adjust the shaft length to change the distance 123.

The base 104 may be designed to rest on or contact a ground surface such that a user of the walking device 102 may apply a downward force on the ground surface via the handle 106, shaft 108, and base 104. The base 104 may have a polyhedron shape that includes a first face 110, a second face 112, and a plurality of sides 114 extending from the first face 110 to the second face 112. In some embodiments, the polyhedron shape may include a prism. The plurality of sides 114 may include at least 3 sides. In that regard, the base 104 may have a triangular prism shape, a cube shape, rectangular prism shape, a hexagonal prism shape, or the like. As shown in FIGS. 1A-1C, the base 104 has a hexagonal prism shape with the first face 110 and the second face 112 having a hexagonal shape and 6 sides 114 that each have a rectangular shape.

The base 104 may have a base diameter 118 extending across a width of the base 104 (e.g., the diameter may be identified as the greatest dimension of the first face 110). The shaft 108 may similarly have a shaft diameter 116. The base diameter 118 may be greater than the shaft diameter 116. For example, the base diameter 118 may be one and a half times as large as the shaft diameter 116, twice as large as the shaft diameter 116, three times as large as the shaft diameter 116, four times as large as the shaft diameter 116, five times as large as the shaft diameter 116, 6 times as large as the shaft diameter 116, 8 times as large as the shaft diameter 116, 10 times as large as the shaft diameter 116, or the like. Because the base diameter 118 is significantly greater than the shaft diameter 116, a user may apply a force to the base 104 using a foot, and the force applied to the base 104 may cause the first face 110 of the base 104 to approach the ground surface, thus raising the shaft 108 such that the user may grasp the handle 106 without bending over. That is, the user may place at least a portion of his foot on the second face 112 of the base 104 and urge that portion of the second face 112 downward, thus forcing the first face 110 towards the ground and raising the handle 106 and shaft 108.

Referring still to FIGS. 1A, 1B, and 1C, the base 104 may be formed using multiple components including a body 120, a top 122, and a bottom 124. The body 120 may form the bulk of the base 104 and may be formed with the polyhedron shape of the base 104. The body 120 may be formed as a solid mass or at least partially hollow. As shown in FIG. 1C, the body 120 may define a cavity 121 and may thus be at least partially hollow. The body 120 may be formed using any materials such as a plastic, a metal, another polymer, or the like.

The top 122 may be formed using a metal and may be coupled to the body 120. In that regard, the top 122 may be referred to as a metal top 122. For example, a sheet of metal may be cut to match the shape of the second face 112 and may then be coupled to the second face 112, for example, using fasteners, adhesive, or the like. The metal top 122 may be attracted to magnets and may thus facilitate retrieval of the base 104 using the magnetic retriever. The metal top 122 may also provide a relatively strong surface for a user to step on or otherwise apply force with a foot.

The bottom 124 may be formed using any material. The bottom 124 may be formed to have a shape that matches the shape of the first face 110 and then may be coupled to the first face 110 using fasteners, adhesive, or the like. In some embodiments, it may be desirable for the bottom 124 to be formed using a sticky material. That is, the material of the bottom 124 may have a greater coefficient of friction than the material of the metal top. For example, the bottom 124 may be formed using rubber, or a material (e.g., rubber or a polymer) may be sprayed onto the first face 110 to increase the coefficient of friction of the first face 110 to form the bottom 124. The stickiness of the bottom 124 allows the bottom 124 to "stick" to a ground surface as a user applies a force to the top 122, thus increasing the ability to raise the handle 106 using the foot.

As described above, the base 104 may have a base diameter 118 corresponding to a diameter of the body 120 and the bottom 124. The base 104 may also have a diameter 136 at the second face 112 and the top 122. The diameter 136 may be the same as, less than, or greater than the diameter 118 of the base 104 at the first face 110. For example, each of the base diameter 118 and the diameter 136 may be between 2 inches and 12 inches, between 2 inches and 8 inches, between 3 inches and 7 inches, or about 5 inches. Where used in this context, about refers to the referenced value plus or minus 10 percent of the referenced value.

In some embodiments (e.g., the embodiment of FIGS. 1A-1C in which the base 104 is a hexagonal prism), the sides 114 may have a side length 138. Since the base 104 is a hexagonal prism, the side length 138 may be less than the diameters 118, 136. In some embodiments, the side length 138 of different sides may vary. That is, a first side length of a first side may be greater than a second side length of a second side. For example, the side length 138 may be between 1 inch and 5 inches, between 2 inches and 4 inches, or about 2.5 inches.

The base 104 may have a dimension 140 extending from the first face 110 to the second face 112. That is, the dimension 140 may correspond to a thickness of the body 120. The dimension 140 may be, for example, between 0.25 inches and 3 inches, between 0.5 inches and 2 inches, or about 1.5 inches.

In some embodiments, the base may include one or more aperture therethrough. As shown in FIG. 1C, the body 120 defines an aperture 132 and the metal top 122 defines an aperture 134 that aligns with the aperture 132 of the body 120. The apertures 132, 134 may be centered along the second face 112 of the body 120 and designed to receive a portion of the shaft 108. That is, the shaft 108 may be received by the apertures 132, 134 to couple the shaft 108 to the base 104. In some embodiments, an interference fit between the apertures 132, 134 and the shaft 108 may be sufficient to couple the shaft 108 to the base 104. In some embodiments, additional features may be used to couple the shaft 108 to the base 104 (e.g., adhesive, fasteners, screw threading on an outside of the shaft 108 and an inside of the aperture 132, or the like).

The walking device 102 may include one or more metallic feature coupled thereto or positioned thereon to facilitate retrieval using the magnetic retriever 101. In that regard, the one or more metallic feature may be formed using a metal that experiences magnetic forces. For example, one or more of the metallic features may include an iron, a cobalt, a gadolinium, a nickel, or alloys that include one or more of these metals.

As shown in FIG. 1A, the walking device 102 may include a first metallic feature 126. The metallic feature 126 may include a piece of metal coupled to the walking device 102. As shown, the metallic feature 126 may include a piece of metal that is permanently or removably coupled to the handle 106 using a line. In that regard, the position of the metallic feature 126 relative to the handle 106 may vary by movement of the line 128. For example, the line 128 may include a metal (e.g., a non-magnetic metal such as aluminum, copper, lead, tin, titanium, zinc, alloys such as brass and bronze, or the like), a polymer (e.g., fluorocarbon or monofilament), or the like. In that regard, the metallic feature 126 may be reached using the magnet of the magnetic retriever 101 regardless of the position of the walking device 102, allowing retrieval of the handle 106 regardless of the position of the walking device 102.

The system 100 may also include a metallic sheet 130 coupled to the walking device 102. As shown in FIG. 1A, the metallic sheet 130 may include multiple metallic sheets coupled to some or all of the sides 114 of the base 104. The metallic sheets 130 may be cut and coupled to the base 104 using fasteners, adhesive, or the like. In that regard, the user may retrieve the base 104 of the walking device 102 via attraction between the metallic sheet 130 and the magnet of the magnetic retriever 101.

The system 100 may further include an additional magnetic feature 103. The metallic feature 103 may include a metallic sheet, a piece of metal, or the like. The metallic feature 103 may be coupled to any object for which retrieval using the magnetic retriever is desired. For example, the metallic feature 103 may include a piece of metal with an aperture therethrough and may be coupled to a keyring using a fastener extending through the aperture and the keyring. As another example, the metallic feature 103 may include a metallic sheet with adhesive coupled thereto such that the metallic sheet may be coupled to an object (e.g., a mobile phone case) to facilitate retrieval of the object using the magnetic retriever 101. In that regard, the system 100 may be used with any object for which assisted retrieval is desired by coupling the metallic feature 103 to the object and using the magnetic retriever 101 for retrieval.

Figure 1D:
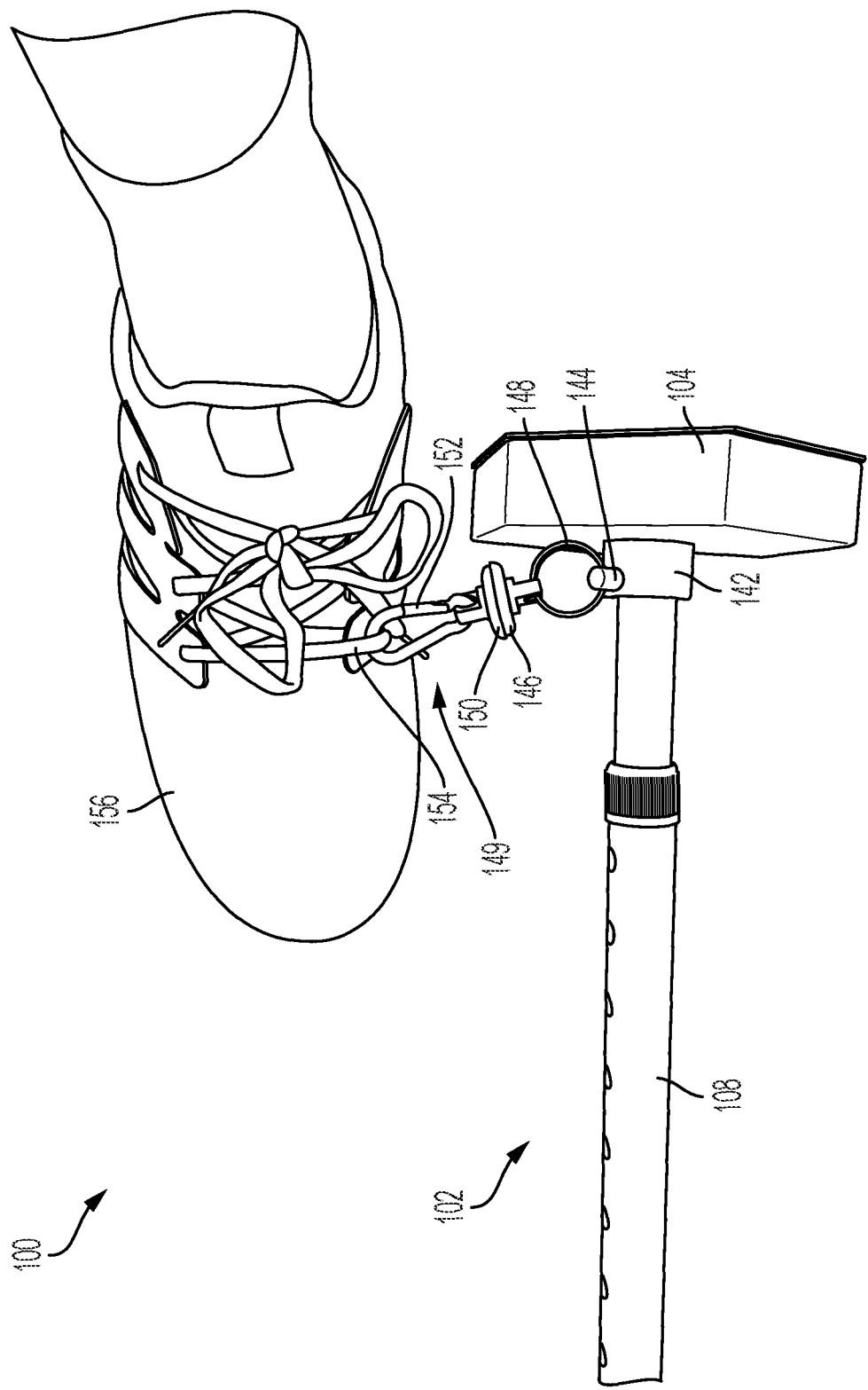
FIG. 1D is a side view of a portion of the walking device of FIG. 1A with a magnet attached near a base for mating with a magnet coupled to an article of clothing, in accordance with various embodiments of the present disclosure.

In some embodiments and referring to FIG. 1D, additional features of the system 100 are shown. In particular, the walking device 102 may include a protrusion 144 or similar feature (e.g., a portion of the walking device 102 may define an opening) to which a magnet may be attached. As shown in FIG. 1D, the protrusion 144 may extend from the raised sheath 142 of the base 104 and may define an opening (e.g., the protrusion 144 may have a shape similar to a loop with an annular body defining the opening). The protrusion 144 may be used to couple a magnet 146 (or metallic feature 146) to the walking device 102. For example, a permanent or removable connector 148 (e.g., a carabiner, a ring (e.g., a keyring), a clip, a snap-fit connector, or the like) may be used to removably (or permanently) attach the magnet 146 to the walking device 102 via the protrusion 144. When the magnet (or metallic feature) 146 is attached to the walking device 102, another magnet or metallic feature may be used to retrieve the walking device 102 without requiring a user to bend over.

FIG. 1D further shows a magnetic retriever 149 that is designed to be coupled to an article of clothing and to be used to retrieve the walking device 102. In particular, the magnetic retriever 149 may include a magnet 150 (or metallic feature 150). The magnetic retriever 149 may also include a connector 152. The connector 152 may include any permanent or removable connector (e.g., a carabiner, a ring (e.g., a keyring), a clip, a snap-fit connector, or the like) that is designed to couple to the magnet 150 and to an article of clothing. As shown in FIG. 1D, the article of clothing is a shoe 156; however, one skilled in the art will realize that any alternative article of clothing (including accessories) may be used without departing from the scope of the present disclosure. As shown, the shoe 156 may include or have an attached connection point 154 (e.g., an exposed portion of a shoelace, a fabric loop attached to the shoe 156, or the like). The connector 152 may be attached to the connection point 154, thus coupling the magnet 150 to the shoe 156. The user may then move the shoe 156 such that the magnet 150 is near the magnet 146 of the walking device 102, and may then continue to move the shoe 156 to retrieve the walking device 102 with minimal risk of falls. In some embodiments, the magnet 150 may cause the base 104 to remain in a predetermined orientation relative to the shoe 156, allowing the user to more easily use the shoe 156 to step on the base 104 to cause the walking device 102 to stand upright.

If the connector 152 is a removable connector, the entire magnetic retriever 149 may be removed from the shoe 156 and attached to a different article of clothing (e.g., a new shoe, socks, or the like). For example, the magnetic retriever 149 may be coupled to a jacket. If the walking device 102 falls to the ground, the user may remove his jacket and hang it towards the floor such that the magnet 150 is near and attracts to the magnet 146, and may then use the jacket to retrieve the walking device 102 with minimal risk of falls.

Figures 2A, 2B:
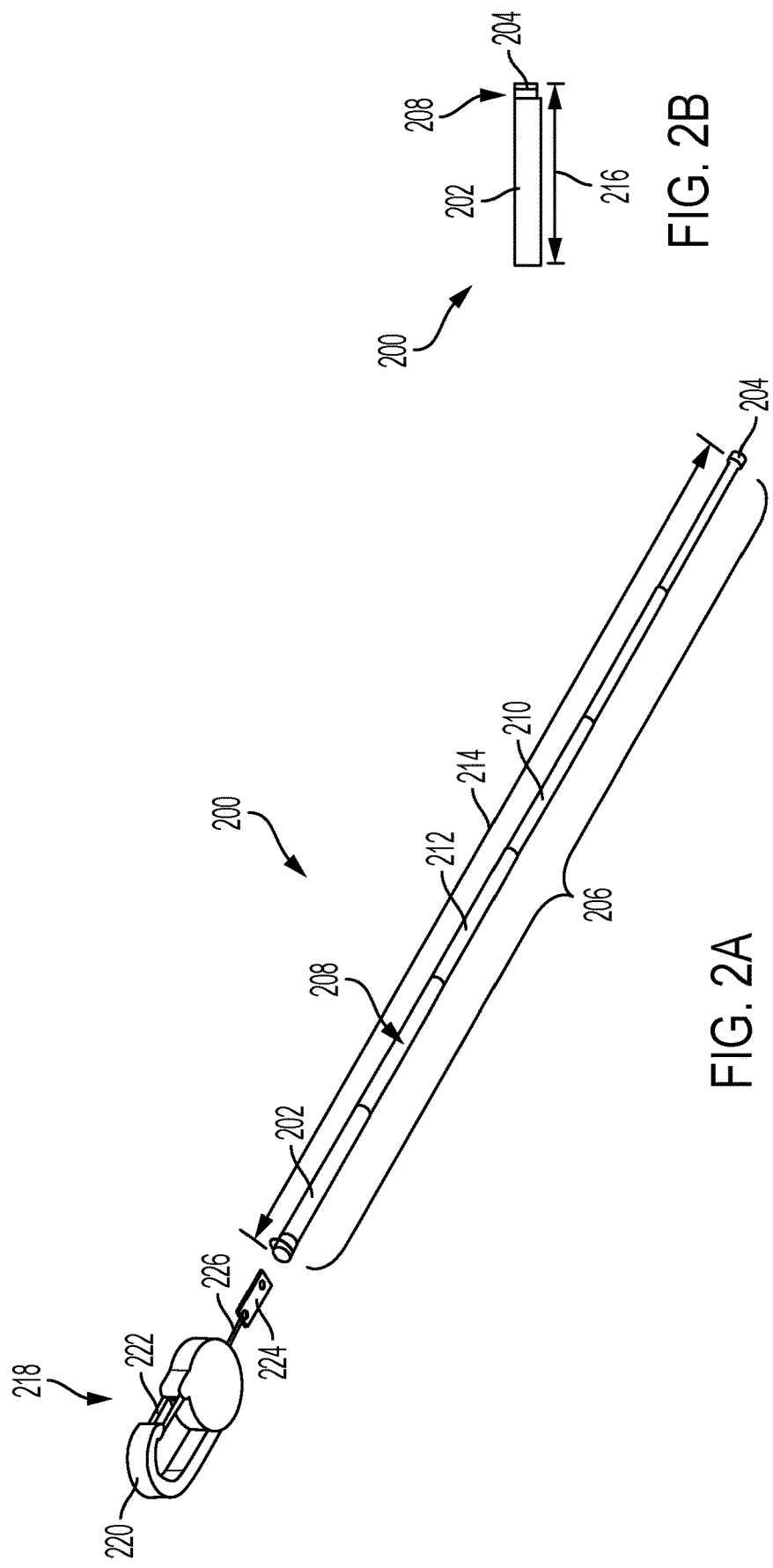
FIG. 2A is a perspective view of a system for reducing the likelihood of falls including details of a magnetic retriever, in accordance with various embodiments of the present disclosure.
FIG. 2B is a side view of the magnetic retriever of FIG. 2A in a compacted state, in accordance with various embodiments of the present disclosure.

Turning now to FIGS. 2A and 2B, an exemplary magnetic retriever 200 is shown. The magnetic retriever 200 may be used as the magnetic retriever 101 of FIG. 1A to retrieve any object with a metallic feature. The magnetic retriever 200 may include a retriever handle 202, a magnet 204, and a telescoping arm 206. The telescoping arm 206 may be coupled to the retriever handle 202 and the magnet 204, and may extend from the retriever handle 202 to the magnet 204. In that regard, a user may grip the magnetic retriever using the retriever handle 202, may cause the magnet 204 to attract a metallic feature, and may maneuver the magnetic retriever 200 using the retriever handle 202 and the telescoping arm 206.

In some embodiments, the telescoping arm 206 may include a plurality of segments 208 designed to telescope relative to each other. That is, a segment 210 may be received by a volume defined by a second 212 to shorten the telescoping arm 206. The segments 208 may be separated to increase a length of the telescoping arm 206 and may be compacted together to decrease the length of the telescoping arm 206. In that regard, some segments 208 may have a greater diameter than adjacent segments. It may be desirable for the retriever end of the telescoping arm 206 to have a greater diameter than the magnet end such that the handle may be gripped regardless of whether the telescoping arm 206 is elongated or compacted.

The telescoping arm 206 may be formed from any material such as a metal, a plastic, a polymer, or the like. In some embodiments, the telescoping arm 206 may be formed using a non-magnetic metal such as aluminum, copper, lead, tin, titanium, zinc, alloys such as brass and bronze, or the like.

The retriever handle 202 may include any handle designed for gripping. For example, the handle may be a separate component from the telescoping arm 206 and coupled to the telescoping arm, may include an end segment of the segments 208, may include a material (e.g., rubber or foam) positioned around an outer surface of an end segment, or the like.

The magnet 204 may include any magnet that magnetically attracts certain metals. The magnet 204 may be formed integral with the telescoping arm 206, or may be coupled to the telescoping arm 206 using any technique such as use of an adhesive, use of a fastener, use of a clip, use of screw threading, or the like.

The telescoping arm 206 may be adjusted to increase or decrease a distance between the retriever handle 202 and the magnet 204. In that regard, the telescoping arm 206 may have a first distance 214 when the telescoping arm 206 is fully elongated and a second distance 216 when the telescoping arm 206 is fully compacted. The first distance 214 may be greater than the second distance. For example, the first distance 214 may be between 1 foot and 10 feet, between 2 feet and 5 feet, about 3 feet, or the like. The second distance 216 may be between 0.1 feet and 5 feet, between 0.5 feet and 2 feet, or about 1 foot. In some embodiments, the second distance 216 may be the same as a length of each of the segments 208.

The magnetic retriever 200 may include a connector 218 coupled thereto. The connector 218 may be formed integral or monolithic with the magnetic retriever 200 (e.g., may be formed monolithic with the retriever handle 202 or the telescoping arm 206) or may be coupled to the magnetic retriever 200 using any known technique (e.g., coupled to the retriever handle 202 or a location close thereto). For example, the connector 218 may be coupled to the magnetic retriever using an adhesive, a clip, a fastener, screw threading, or the like. In some embodiments, the connector 218 may include a fastener 224 designed to couple the connector 218 to the retriever handle 202 or the telescoping arm 206. The fastener 224 may be coupled to the connector 218 via a flexible line 226 formed using any material such as fluorocarbon, monofilament, thread, rope, or the like. The connector 218 may be designed to attach to an external object such as a hook, a doorway, a piece of clothing, a keychain, or any other external object.

In some embodiments, the connector 218 may include a clip designed to removably attach the magnetic retriever 200 to an external object. In that regard, the clip 218 may include a loop 220 defined by the clip 218 within which another loop or object may be positioned. The clip 218 may further include a spring-loaded gate 222 that is biased towards a closed position in which the loop 220 and gate 222 form a closed loop. The loop 220 may be positioned within an opening of an object (e.g., through a keychain) with the spring-loaded gate 222 in an open position, and then the spring-loaded gate 222 may be released to close the loop 220, thus coupling the connector 218 to the object. The spring-loaded gate 222 may then be actuated to open the loop 220, thus allowing the object to be removed from the loop 220 and thus decoupling the connector 218 from the object.

Figure 3A:
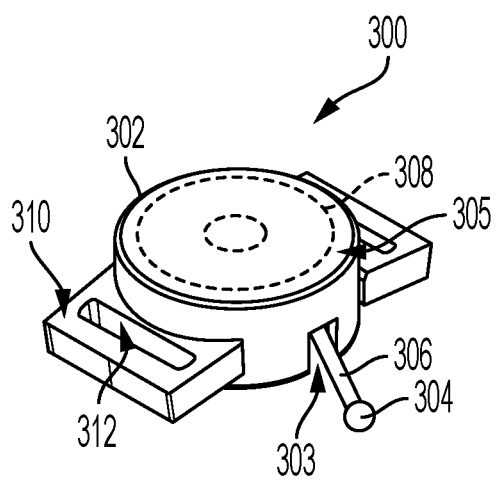
FIG. 3A is a perspective view of a magnetic retriever having a retractable reel and wings for receiving a band, in accordance with various embodiments of the present disclosure.

Turning now to FIG. 3A, an exemplary magnetic retriever 300 is shown. The magnetic retriever 300 may be used as the magnetic retriever 101 of FIG. 1A to retrieve any object with a metallic feature. The magnetic retriever 300 may include a retriever base 302. The magnetic retriever 300 may also include a magnet 304 designed to attract metals that experience magnetic forces such as iron, nickel, or the like. The magnet 304 may be coupled to a flexible line 306 that is also coupled to the retriever base 302.

The retriever base 302 may have any shape such as square, rounded, elongated, or any other shape. The retriever base 302 may define or include a hollow volume 305. In some embodiments, the hollow volume 305 may have a circular shape. A retractable reel 308 may be positioned within the hollow volume 305, and the flexible line 306 may be wound about the retractable reel 308. An aperture 303 may exist through the retriever base 302 through which the flexible line 306 may move.

The magnet 304 and flexible line 306 may be drawn away from the retriever base 302 to extend a distance between the retriever base 302 and the magnet 304. In some embodiments, the retractable reel 308 may be biased in a certain direction that causes the flexible line 306 to wind about the retractable reel 308 when no force is applied to a distal end of the flexible line 306. The retriever base 302 may be held with the magnet 304 and flexible line 306 dangling therefrom and maneuvered to position the magnet 304 close to an object with a metallic feature. A user may then retract the magnet 304 (e.g., by manually pulling the flexible line 306 or by allowing the bias of the retractable reel 308 to wind up the flexible line 306 about the retractable reel 308) to retrieve the object (via the attraction between the magnet 304 and the metallic feature).

The magnetic retriever may further include a connector designed to facilitate coupling of the magnetic retriever 300 to an object. In the embodiment shown in FIG. 3A, the connector may include two wings 310 extending away from the retriever base 302 on opposite sides of the retriever base 302. Each of the wings 310 may define a slot 312 therethrough, and the slots 312 may be oriented parallel to each other. In that regard, a band (such as a watch band) may be positioned through the slots 312 of each of the wings 310, and the band may be positioned about an object (such as a human wrist) to couple the magnetic retriever to the object. In that regard, the magnetic retriever 300 may be worn in a similar manner as a watch.

Figure 3B:
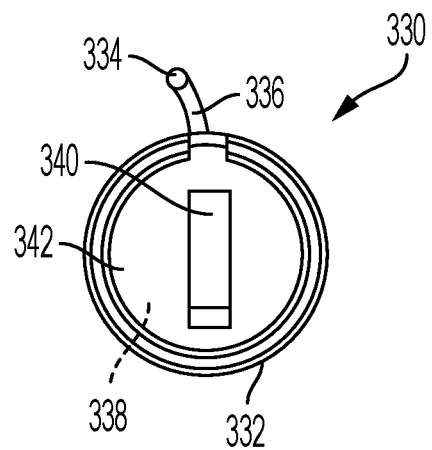
FIG. 3B is a top-down view of a magnetic retriever having a retractable reel and a spring clip, in accordance with various embodiments of the present disclosure.

Turning now to FIG. 3B, another embodiment of a magnetic retriever 330 is shown. The magnetic retriever 330 may include a retriever base 332 that has similar features as the retriever base 302 of FIG. 3A. For example, the retriever base 332 may define a volume in which a retractable reel 338 may be position, and a flexible line 336 may be wound around the retractable reel 338. A magnet 334 may be coupled to the flexible line in a similar manner as in the magnetic retriever 300 of FIG. 3A.

The magnetic retriever 330 of FIG. 3B may also include a connector designed to facilitate coupling of the magnetic retriever 330 to an object. In the embodiment shown in FIG. 3B, the connector may include a spring clip 340. The spring clip 340 may be coupled to, and apply a force towards, a surface 342 of the retriever base 332. An object (such as a piece of fabric, for example, fabric defining a shirt pocket) may be positioned between the spring clip 340 and the surface 342 of the retriever base 332, and the bias of the spring clip 340 towards the surface 342 may removably couple the magnetic retriever to the object. In that regard, the magnetic retriever 330 may be worn in a similar manner as any other wearable item having a clip (such as a dress clip, a clip-on tie, or the like).

Figure 3C:
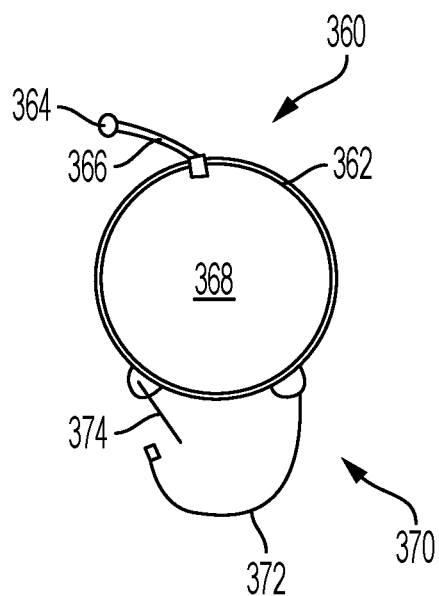
FIG. 3C is a top-down view of a magnetic retriever having a retractable reel and a connector having a loop and a spring-loaded gate, in accordance with various embodiments of the present disclosure.

Referring now to FIG. 3C, another embodiment of a magnetic retriever 360 is shown. The magnetic retriever 360 may include a retriever base 362 that has similar features as the retriever base 302 of FIG. 3A. For example, the retriever base 362 may define a volume in which a retractable reel 368 may be position, and a flexible line 366 may be wound around the retractable reel 368. A magnet 364 may be coupled to the flexible line in a similar manner as in the magnetic retriever 300 of FIG. 3A.

The magnetic retriever 360 of FIG. 3B may also include a connector designed to facilitate coupling of the magnetic retriever 360 to an object. In the embodiment shown in FIG. 3C, the connector may include a similar clip connector 370 as the connector 218 of FIG. 2A. In that regard, the connector 370 may include a loop 372 coupled to, or defined by, the retriever base 362 within which another loop or object may be positioned. The connector 370 may further include a spring-loaded gate 374 that is biased towards a closed position in which the loop 372 and gate 374 form a closed loop. The loop 372 may be positioned within an opening of an object (e.g., through a keychain) with the spring-loaded gate 374 in an open position, and then the spring-loaded gate 374 may be released to close the loop 372, thus coupling the connector 370 to the object. The spring-loaded gate 374 may then be actuated to open the loop 372, thus allowing the object to be removed from the loop 372 and thus decoupling the connector 370 from the object.

Turning now to FIGS. 4A, 4B, 4C, and 4D, another system 400 for reducing the likelihood of falls is shown. The system 400 includes a magnetic retriever 401, a walking device 402, and some metallic features (not shown). The magnetic retriever 401 and metallic features may be similar to any other magnetic retrievers and metallic features described herein.

The walking device 402 may function as a cane and may include a base 404 designed to contact a ground surface, a handle 406 for grasping by a user, and a telescoping shaft 408 coupled to and extending from the handle 406 to the base 404. Each of the base 404, handle 406, and telescoping shaft 408 may be formed using any materials such as metals, plastics, rubbers, other polymers, or the like. Each of the handle base 404, the handle 406, and the telescoping shaft 408 may be permanently coupled together, formed integral or monolithic, removably coupled together, or any combination thereof.

At least one of the handle 406 or the telescoping shaft 408 may define an opening or hole 410 therethrough. A fastener 412 may extend through the opening or hole 410 and may be coupled to the magnetic retriever 401. The fastener 412 may include any fastener such as a keyring, a clip, or the like. In some embodiments, the opening or hole 410 and the fastener 412 may be replaced with any other attachment means capable of removably or permanently coupling the magnetic retriever 401 to the walking device 402 (e.g., a magnet on the magnetic retriever 401 and metal on the walking device 402). In that regard, the user may clip at least one of the walking device 402 or the magnetic retriever 401 to the user's body (e.g., to an item of clothing such as a belt loop) to always have the walking device 402 within reach. Furthermore, the user may always have access to the magnetic retriever 401 since it is coupled to the walking device 402, thus allowing the user to retrieve any object with a magnetic feature via use of the magnetic retriever 401.

As referenced above, the telescoping shaft 408 of the walking device 402 may have a plurality of segments 414 that may telescope relative to each other. For example, a first segment 416 may receive a second segment 418. In that regard, a total length of the telescoping shaft 408 may be reduced by telescoping the segments 414 together, and may be increased by separating the segments 414 from each other.

It may be undesirable for the segments 414 to telescope during use of the walking device 402. In that regard, the telescoping shaft 408 may include locking elements 420 to retain the segments 414 in place relative to each other during use of the walking device 402. The embodiment shown in FIGS. 4A-4D include push pins as the locking elements 420, however, any additional or alternative locking elements are contemplated to be within the scope of the present disclosure.

In the illustrated embodiment, most or all of the segments 414 may be hollow (e.g., a first segment 416 may define a volume 428 therein) such that an adjacent segment may be received within the volume 428 of the adjacent segment. For example, the volume 428 of the first segment 416 may receive a second segment 418 therein. Stated differently, the second segment 418 may be located within the volume 428 of the first segment 416. A push pin 422 may be coupled to the second segment 418 and may be biased radially outward from the second segment 418. In that regard, the position of the second segment 418 within the first segment 416 may be adjusted such that the push pin 422 is aligned with an opening 425 of the first segment 416. In response to alignment of the push pin 422 with the opening 425 causes the push pin 422 to extend radially outward through the opening 425 due to the outward bias of the push pin 422, thus locking the second segment 418 in place relative to the first segment 416. This action may be performed for each segment 414 until the walking device is fully extended, as shown in FIG. 4A.

To compress the segments 416, 418 to reduce the length of the walking device 402, the push pin 422 may be urged inward such that it is removed from the opening 425 while the second segment 418 is urged into the volume 428 defined by the first segment 416. This action may be performed for each segment 414 until the walking device 402 is fully compressed, as shown in FIGS. 4C and 4D.

Some segments 414 may have an inner diameter that is less than an outer diameter of an adjacent segment 414 to facilitate the telescoping of the segments 414. For example, an inner diameter 430 of the first segment 416 may be greater than an outer diameter 432 of the second segment 418, thus allowing the second segment 418 to be received by the volume 428 of the first segment 416. Although the embodiment shown in FIGS. 4A-4D places smaller-diameter segments closer to the handle 406 than the base 404, the opposite configuration is considered within the scope of the present disclosure.

In some embodiments, a hinge or joint 426 may be positioned between the handle 406 and the shaft 408. The hinge or joint 426 may allow the handle 406 to rotate or pivot relative to the telescoping shaft 408. Stated differently, the hinge or joint 426 may allow the handle 406 to rotate between an in-use position as shown in FIG. 4C in which the handle 406 is positioned in such a way that a user can apply weight to the ground via the handle 406, shaft 408, and base 404, and a storage position as shown in FIG. 4D in such a way that the handle 406 may be positioned adjacent to the shaft 408 to reduce a footprint of the walking device 402 for storage. A locking mechanism may be used to cause the handle 406 to remain in place relative to the shaft 408 in at least one of the in-use position or the storage position. For example, the locking mechanism may include a push pin and opening, a locking lever, or any other locking mechanism.

Turning now to FIGS. 5A, 5B, 5C, 5D, and 5E, another system 500 for reducing the likelihood of falls is shown. The system 500 may include a magnetic retriever 502, another magnetic retriever 512, a rubber housing 522, and a tracking tag 524, along with other features as described below. The magnetic retriever 502 may have similar features as the magnetic retriever 200 of FIG. 2A. Namely, the magnetic retriever 502 may have a magnet 504, a retriever handle 506, and a telescoping arm 508 coupled between the magnet 504 and the handle 506. These components may be similar to, and function in a similar way as, the magnetic retriever 200 of FIG. 2A. The magnetic retriever 502 may further include a connector 510 coupled thereto. For example, the connector 510 may be coupled to the handle 506 and may include any type of connector such as a ring onto which other connectors may fasten (the illustrated embodiment), a clip, a magnet, a snap-fit connector, or the like.

Figure 5B:
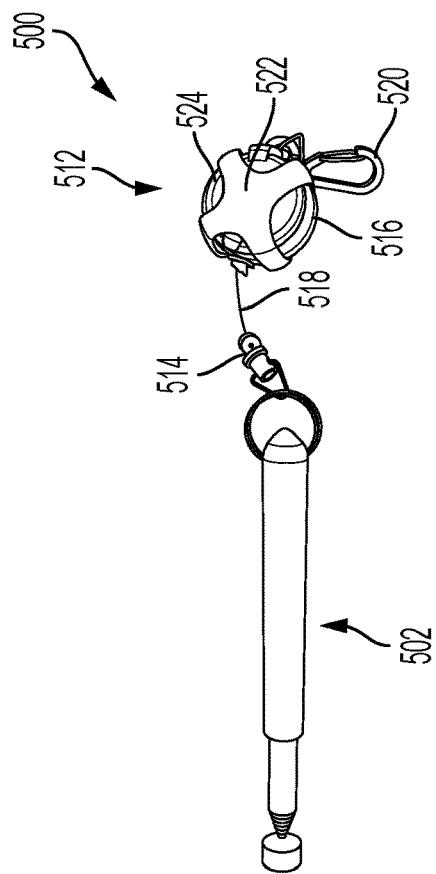
FIG. 5B is a side view of the system of FIG. 5A with a tracking tag coupled to the retractable reel, in accordance with various embodiments of the present disclosure.
Figure 5C:
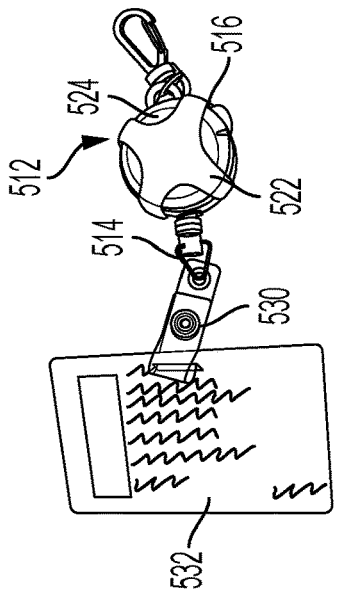
FIG. 5C is a side view of the system of FIG. 5A with a badge coupled to the retractable reel, in accordance with various embodiments of the present disclosure.
Figure 5A:
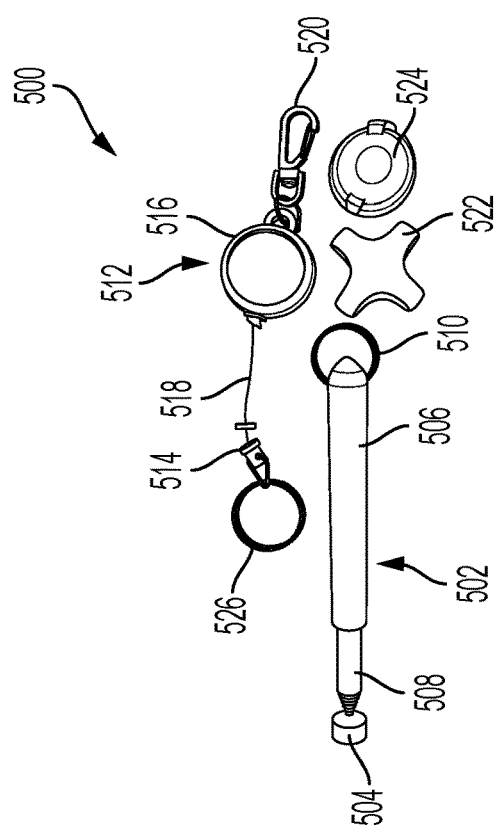
FIG. 5A is a side view of a system for reducing the likelihood of falls and include a magnetic retriever and a retriever with a retractable reel, in accordance with various embodiments of the present disclosure.
Figure 5D:
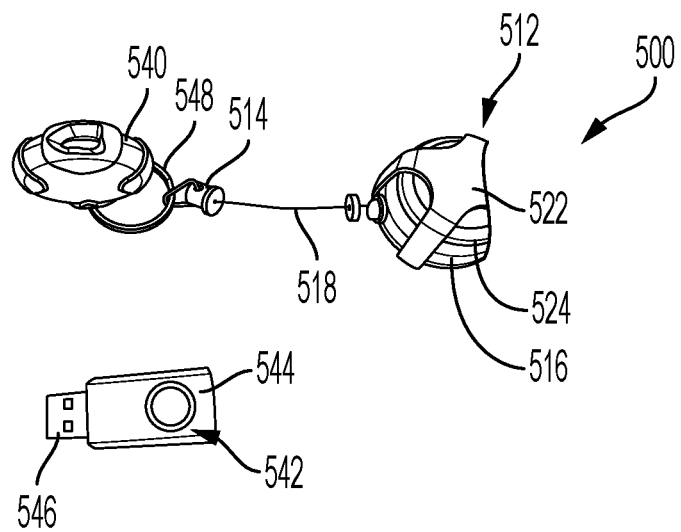
FIG. 5D is a side view of the system of FIG. 5A with a USB housing coupled to the retractable reel, in accordance with various embodiments of the present disclosure.
Figure 5E:
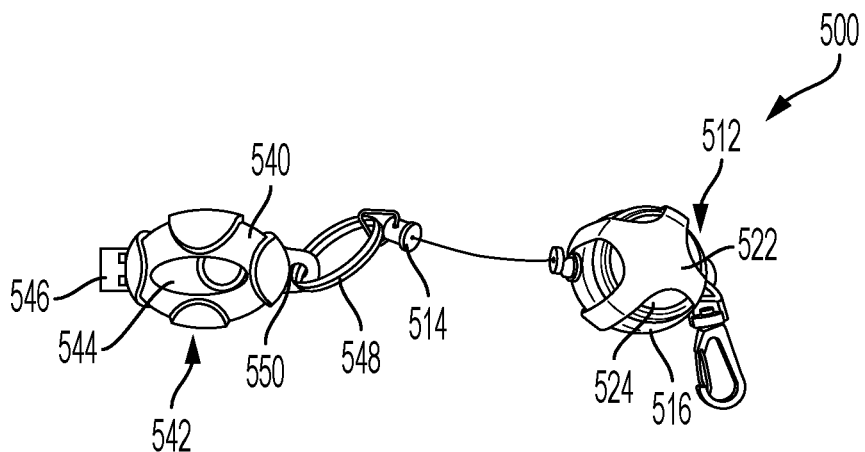
FIG. 5E is a side view of the system of FIG. 5D with a USB key positioned within the USB housing, in accordance with various embodiments of the present disclosure.

The magnetic retriever 512 may have similar features as the magnetic retriever 300 of FIG. 3A. For example, the magnetic retriever 512 may include a connector 514, a retractable reel 516, and a flexible line 518 coupled to and extending between the connector 514 and the retractable reel 516. The connector 514 may include any connector capable of removable connection to an external element such as a magnet, a clip, a fastener, a key ring, or the like. In that regard, various elements may be coupled to the end of the flexible line 518 via the connector 514. For example, a magnet may be coupled to the connector 514, a badge strap 530 may be coupled to the connector 514 to couple a badge 532 to the magnetic retriever 512 (as shown in FIG. 5C), the magnetic retriever 502 may be coupled to the magnetic retriever 512 via the connector 514 (as shown in FIG. 5B), a USB housing 540 may be coupled to the magnetic retriever 512 via the connector 514 (as shown in FIG. 5E), or the like. In that regard, the magnetic retriever 512 may exist without a magnet and may thus be referred to as a simply a retriever 512 as it may retrieve any metallic object (when the connector 514 is attached to a magnet) or any other object coupled to the connector 514.

The retriever 512 may also be coupled to a fastener 520 (e.g., a clip). The fastener 520 may be used to removably couple the retriever 512 to any external object (e.g., clothing, a tablecloth, a hook, a coat hanger, or the like). In that regard, the retriever 512 may remain easily accessible by coupling the retriever 512 to a known location using the fastener 520.

The tracking tag 524 may transmit a wireless signal (e.g., periodically, continuously, from time to time, in response to receipt of a signal, or the like). The signal may include a near field identification (NFID) signal, a Bluetooth® signal, a Wi-Fi signal, or any other wireless signal. The tracking tag 524 may have any shape such as rectangular, square, triangular, circular, or the like. The tracking tag 524 may include an internal battery that may be permanently installed, replaceable, rechargeable, or the like. For example, the tracking tag may include an AirTag® (available from Apple Inc. of Cupertino, CA), a TILE® (available from Tile, Inc. of San Mateo, CA), or any other tracking tag. A receiver (e.g., a mobile phone, a wireless router, or the like) may receive a signal from the tracking tag 524 and may identify a relative or absolute location of the tracking tag 524.

The rubber housing 522 may be flexible and may include arms that surround at least one of the retractable reel 516 or the tracking tag 524. The rubber housing 522 may include rubber or any other flexible material capable of being reshaped and springing back to its original form. In that regard, the retractable reel 516 and the tracking tag 524 may be positioned adjacent to each other, and the rubber housing 522 may be positioned around the retractable reel 516 and the tracking tag 524. In that regard, the rubber housing 522 may retain the tracking tag 524 in place relative to the retractable reel 516. This pairing of the tracking tag 524 to the retractable reel 516 reduces the likelihood of loss of the retractable reel 516 since the location of the tracking tag 524 may be identified based on the signal output by the tracking tag 524. FIGS. 5B, 5C, 5D, and 5E illustrate the tracking tag 524 coupled to the retractable reel 516 via the rubber housing 522, and FIG. 5A illustrates the tracking tag 524 separated from the retractable reel 516.

The system 500 may further include a USB housing 540 and a USB key or USB stick 542. The USB housing 540 may be made from any flexible material, such as the material of the rubber housing 522. Because of the flexibility of the material, the USB housing 540 may be stretched in response to a force and may return to its original size and shape in response to a release of that force. In that regard, the USB housing 540 may be stretched by force, the USB key 542 may be placed within an opening defined by the USB housing 540, and the USB housing 540 may enclose the USB key 542 in response to the force being released.

The USB housing 540 may define an opening 550 therethrough. The opening 550 may be sufficiently large to receive a connector 548, such as a key ring or other connector. The connector 514 of the retriever 512 may be coupled to the USB housing 540 via the opening 550. As shown in the embodiment of FIG. 5E, the connector 514 of the retriever 512 may be coupled to a key ring 548 that extends through the opening 550, thus coupling the connector 514 of the retriever 512 to the USB housing 540 (and the USB key 542). This connection reduces the likelihood of loss of the USB key 542.

A conventional USB key 542 may include a USB body 544 (including electronics housed within a housing) and a USB connector 546 including conductive contacts which may be received by a USB port. The USB housing 540 is designed to include at least one opening through which the USB connector 546 extends without obstruction of the USB connector 546 to allow the USB connector 546 to be received by a USB port. This feature allows the USB key 542 to be used in a USB port while the USB key 542 is still housed within the USB housing 540.

In some embodiments, the USB housing 540 may be coupled to the clip 520 or another connector of the retriever 512 other than the connector 514. In that regard, the retriever 512 may be used as a magnetic retriever (or badge or other retriever, depending on the element coupled to the connector 514) while remaining attached to the USB housing 540. In that regard, the retriever 512 may have multiple functions such as a magnetic retriever and a means for keeping track of the location of a USB key 542.

In some embodiments, the rubber housing 522 may be designed to have a shape other than the shape shown in FIGS. 5A-5E. For example, the rubber housing 522 may be designed with a shape configured to be coupled to the USB key 542, thus allowing the rubber housing 522 to couple the tracking tag 524 and the USB key 542 to the retriever 512 while still allowing the retriever to function as a retriever.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for reducing the likelihood of falls, the system comprising:
    a base having a polyhedron shape with:
        a first face configured to rest on a flat surface,
        a second face spaced apart from and parallel to the first face, and having a base diameter,
        at least three sides extending between the first face and the second face,
        a plurality of metal sheets each coupled to one of the at least three sides,
        a top metal sheet coupled to the second face, and a raised sheath extending from the second face in a direction away from the first face and having a cylindrical shape;
a handle configured for gripping; and
a shaft coupled to and extending between the handle and the second face of the base, having a shaft diameter, and extending outward from the base in a direction perpendicular to a plane defined by the second face,
wherein:
the base diameter is at least twice as large as the shaft diameter such that pressure applied to the second face of the base by a foot causes the handle to raise from a ground surface, and
the base, handle, and shaft together function as a cane.

2. The system of claim 1, wherein the polyhedron is a prism.

3. The system of claim 1, wherein the first face and the second face both have a hexagonal shape, and the polyhedron includes six sides extending from the first face to the second face.

4. The system of claim 3, wherein the base includes a plastic body and a bottom defining or coupled to the first face and formed using a sticky material that has a greater coefficient of friction than the top metal sheet.

5. The system of claim 1, further comprising a metallic feature coupled to the handle to facilitate retrieval of the cane using a magnetic retriever.

6. The system of claim 5, further comprising a magnetic retriever having:
a retriever handle for gripping the magnetic retriever;
a magnet; and
a telescoping arm extending between and coupled to the retriever handle and the magnet, and configured to extend to increase a distance between the retriever handle and the magnet and to collapse to reduce the distance between the retriever handle and the magnet.

7. The system of claim 6, wherein the magnetic retriever further includes a connector configured to removably attach the magnetic retriever to a remote object.

8. The system of claim 5, further comprising a magnetic retriever having:
a retriever base with a retractable reel coupled thereto;
a magnet; and
a flexible line extending between and coupled to the retractable reel and the magnet, and configured to be pulled from the retractable reel to extend the flexible line from the retriever base and to be retracted back onto the retractable reel to wind the flexible line around the retractable reel.

9. The system of claim 8, wherein the magnetic retriever further includes a connector configured to removably attach the magnetic retriever to a target object.

10. The system of claim 8, wherein the magnet is configured to be magnetically coupled to each of the metallic feature, the plurality of metal sheets, the top metal sheet, and another metallic feature coupled to another object.

11. The system of claim 1, wherein each of the at least three sides is coupled to one of the plurality of metal sheets.

12. The system of claim 1, further comprising:
at least one of a device metallic feature or a device magnet coupled to the walking device; and
a magnetic retriever having a retriever connector configured to be coupled to an article of clothing, and having at least one of a retriever metallic feature or a retriever magnet configured for attraction to the at least one of the device metallic feature or a device magnet, such that the article of clothing with the at least one of the retriever metallic feature or the retriever magnet may be used to retrieve the walking device.

13. The system of claim 1, further comprising a magnetic retriever usable to retrieve the walking device via magnetic attraction with metal of the walking device, the magnetic retriever including a clip configured to removably attach the magnetic retriever to a remote object.

14. The system of claim 1, wherein the plurality of metal sheets and the top metal sheet each function as a metallic feature to facilitate retrieval of the cane using a magnetic retriever.

* * * * *